(12) United States Patent
Bengston

(10) Patent No.: US 12,126,760 B2
(45) Date of Patent: Oct. 22, 2024

(54) TELECOMMUNICATIONS TECHNOLOGY

(71) Applicant: Sam Bengston, River Falls, WI (US)

(72) Inventor: Sam Bengston, River Falls, WI (US)

(73) Assignee: T. W. Vending, Inc., River Falls, WI (US)

( * ) Notice: Subject to any disclaimer, the term of this patent is extended or adjusted under 35 U.S.C. 154(b) by 0 days.

(21) Appl. No.: 16/136,319

(22) Filed: Sep. 20, 2018

(65) Prior Publication Data

US 2023/0421691 A1    Dec. 28, 2023

Related U.S. Application Data

(60) Provisional application No. 62/562,644, filed on Sep. 25, 2017.

(51) Int. Cl.
*H04M 3/22* (2006.01)

(52) U.S. Cl.
CPC ................. *H04M 3/2281* (2013.01)

(58) Field of Classification Search
None
See application file for complete search history.

(56) References Cited

U.S. PATENT DOCUMENTS

| | | | |
|---|---|---|---|
| 7,860,222 B1 * | 12/2010 | Sidler | H04L 63/302 |
| | | | 379/85 |
| 10,375,234 B1 * | 8/2019 | Keiser | H04M 3/2281 |
| 10,394,900 B1 * | 8/2019 | Edwards | G06F 16/951 |
| 2009/0067587 A1 * | 3/2009 | Rokosky | H04M 3/53366 |
| | | | 379/69 |
| 2016/0239932 A1 * | 8/2016 | Sidler | H04L 12/1827 |

* cited by examiner

*Primary Examiner* — Quoc D Tran
(74) *Attorney, Agent, or Firm* — Skinner and Associates; Joel Skinner

(57) ABSTRACT

An inmate telecommunications system, apparatus and method. The system enables muting of the incoming audio of one of the call parties of a cell being monitored. A phone switch isolates the non-muted call channel and sends the audio to the monitoring individual.

10 Claims, 2 Drawing Sheets

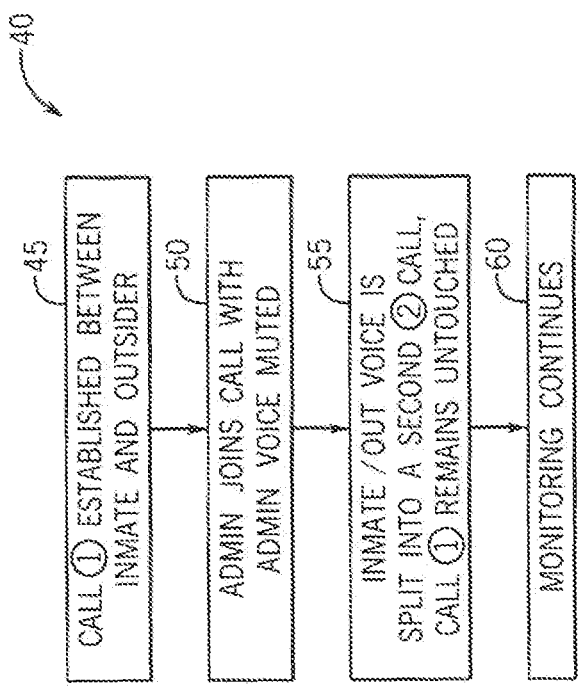
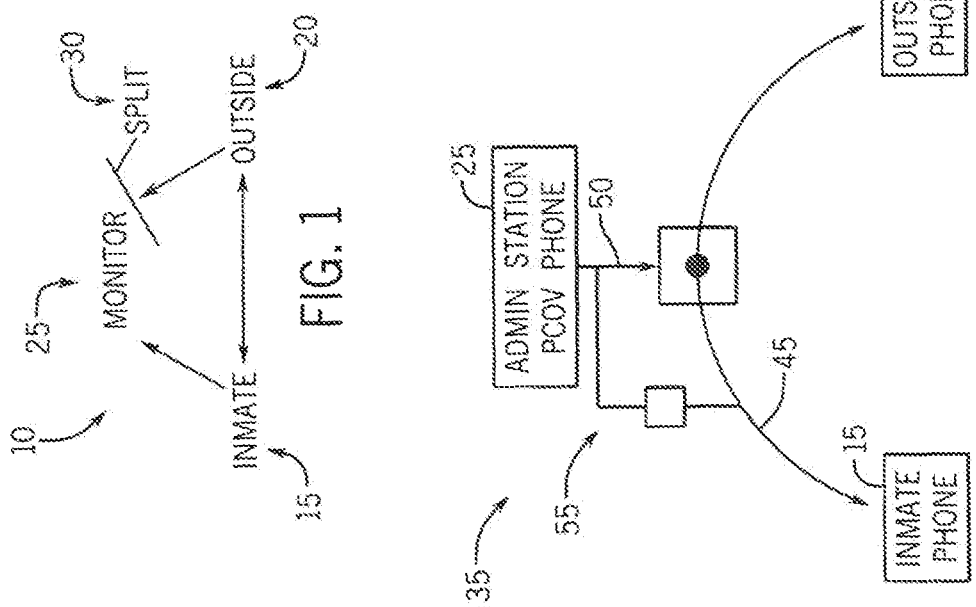

TELECOMMUNICATIONS TECHNOLOGY

CROSS-REFERENCE TO RELATED APPLICATIONS, IF ANY

This application the benefit under 35 U.S.C. § 119(e) of co-pending U.S. Provisional Patent Application Ser. No. 62/562,644, filed Sep. 25, 2017, which is hereby it by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH DEVELOPMENT

Not applicable

REFERENCE TO MICROFICHE APPENDIX, IF ANY

Not applicable.

BACKGROUND OF THE INVENTION

1. Field of the Invention

The present invention relates, generally, to telecommunications systems, apparatus and methods. Particularly, the invention relates to inmate telecommunications systems, apparatus and methods. Most particularly, the invention relates to a system and method for managing inmate telecommunications.

2. Background Information

Persons in jails, detention centers, prisons or other secure facilities (hereinafter "inmates") are typically permitted periodic telephone communication with persons outside such facilities. These outside parties include family, friends and the like. Phone calls between inmates and outside parties are sometimes monitored for security, investigative and other reasons, provided they are non-privileged conversations. The monitoring person(s) is typically a facility staff member (i.e. a Corrections Officer (CO) or facility administrator), law enforcement official, a prosecutor, or the like.

Inmates and/or the outside party(s), sometimes seek to defeat or impede these monitoring efforts by having the outside party play music or other sounds at a high volume, and to have that music or sound picked up by the mouthpiece or transmitting element of the outside telephone (land line telephone, wireless phone, or mobile phone). The loud music is picked up by the outside transmitting device and transmitted to both the inmate and the monitoring individual at their earpiece. It is often possible for the inmate to hear and distinguish the voice communication of the outside speaker, over the loud music, by placing their ear in direct contact or very close to the earpiece of the inmate telephone. In contrast, the monitoring individual is not able to clearly ear and distinguish the outside voice transmission over the loud music. The monitoring individual is often not able to hear and understand the voice transmission of the inmate either. In such cases, the loud music drowns out or overrides the voice of the outside person and sometimes even the inmate. This yields the potential for significant legal, security and safety problems.

Existing technology in this field is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides an inmate telecommunication system, apparatus and methods which are practical, reliable, accurate and efficient, and which are believed to fulfill the need and to constitute an improvement over the background technology.

An authorized system user (for example a jail staff member) within a jail monitors non-privileged phone calls between an inmate and an outside party (far example a family member or friend). During a standard monitoring session, the jail staff hears both the inmate and the outside party. They don't transmit audio his or herself. Utilizing the system of the present invention, a muted monitoring session permits ignoring the incoming audio from one of the call parties. When one side is muted, a phone switch isolates the non-muted call channel and only sends that channel audio to the monitoring jail staff member. This permits the jail staff member to easily monitor one side of the call without interference from the distorting audio of the other side of the call.

In one aspect, the invention provides an apparatus and method including a means of muting a call party to thwart tampering from monitoring the call between an inmate and an outside call participant.

In another aspect, the invention provides secure facility telecommunications system comprising a monitored phone, an outside telecommunication line, an audio monitoring station communicatively connectible to the monitored phone and the outside telecommunication line, and means to mute an audio channel which the audio monitoring station receives from the phone to monitored or an external phone connected to the outside telecommunication line.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 1 is a diagram showing the parties involves in a typical monitored inmate phone call with an outside party, and the interconnections there between.

FIG. 2 a process diagram of the inmate telecommunications system and method the present invention.

FIG. 3 is a flow chart of an embodiment of the method of the invention.

DETAILED DESCRIPTION

Figure 4:
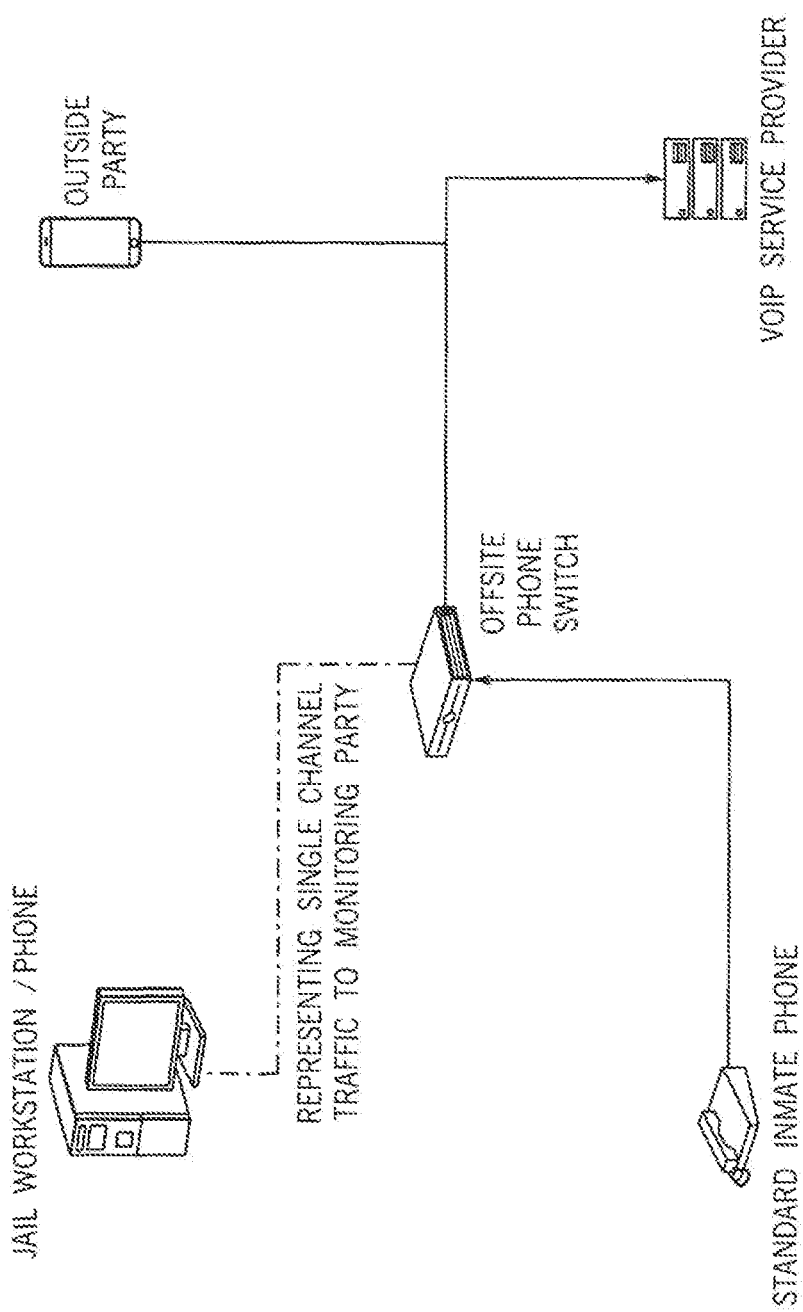
FIG. 4 is a diagram of an embodiment of the system of the invention.

Phone calls between inmates and other persons in jails, detention centers, prisons or other secure facilities and persons outside such facilities (such as family, friends and the like) are sometimes monitored for security, investigative and other reasons. Conversations may be recorded, stored and analyzed provided they are not confidential or privileged communications where for example the outside party is an attorney, physician or other health care provider, clergy person, or the like. The authorized monitoring person is typically a facility staff member (a Corrections Officer (CO), jail staff person, or facility administrator), law enforcement official, or a prosecutor. The monitoring jail staff-person sometimes listens live or in real time to the conversation between the inmate and the person outside the jail. Other times, the monitoring person listens to a recording of the conversations at another time.

Incarcerated individuals sometimes seek to defeat or impede these monitoring efforts by having the outside party play music or other sounds at a high volume, and to have that music or sound picked up ty the mouthpiece or transmitting element of the outside telephone (land line telephone, wireless phone, or mobile phone). The loud music is picked up by the outside transmitting device and transmitted to both the inmate and the monitoring individual at their earpiece. It is often possible for the inmate to hear and distinguish the voice communication of the outside speaker, over the loud music, by placing their ear in direct contact or very close to the earpiece of the inmate telephone. In contrast, the monitoring individual is not able to clearly hear and distinguish the outside voice transmission over the loud music. The monitoring individual is often not able to hear and understand the voice transmission of the inmate either. In such cases, the loud music drowns out or overrides the voice of the outside person, and sometimes even the inmate. This is a problem for secure facilities because the safety and investigative benefits of monitoring are reduced or destroyed. Further, it is possible for such calls between inmates and outsider sot communicate dangerous information, and to enable or facilitate criminal or other harmful activities.

The system and method of the present invention remedies this situation by permitting the monitoring individual(s) or system to mute the sound feed of the line that is transmitting the disruptive loud music or sound. The monitored call consists of two (2) streams. One stream if muted (typically the outside voice and background sound), thus permitting a clear reception and understanding of the remaining steam, typically the inmate voice. This permits satisfactory monitoring activity.

Referring to FIG. 2, when an inmate 15 initiates or receives a call to or from a person 20 outside the jail, prison or other secure facility that connection is essentially a straight phone call through a Public Switched Telephone Network (PSTN). When staff (a Corrections Officer (CO) or a system administrator) 25 at the facility monitors that inmate-outsides call 20 the original call 22a becomes a three way call. But it remains a straight call. The staff 25 call taps into the call between the inmate 15 and the outside party 20, with the staff phone 25 essentially on mute. Monitoring systems such as those provided by Turnkey Corrections (Wisconsin, USA) programmatically stops transmitting audio from the staff phone. So neither the inmate not the outsider are aware of these staff monitoring.

As was discussed above, existing systems are susceptible to tampering though the use of loud music or other sounds played by the outside party.

Referring also to FIG. 2, utilizing an embodiment of the system 10/35 and method of the present invention, if the staff 25 denotes that monitoring is being tampered with or disrupted by outside noise, he or she may listen to only one side and thus abate the disruptive noise. The system 35 has an option for muting the other side, eight the outsider or the inmate. If for example the staff 25 wishes to listen to only the inmate 15, they mute the outsider 20. The original call between the inmate 22 and outsider 29 stays in place. That channel is not interrupted by the system. From the inmate side, the system 35 instructs the inmate side to "split" 30 the audio channel. So one side goes to the outside phone 20 as normal and the second audio hangs to the side or "dangle" during the call. Then, the admin station 25 disconnects from the 3 way call and slide over and hooks up to the dangling audio from the inmate 15.

Referring also to FIG. 3, and embodiment of the method 40 of the invention involves the step 45 of establishing a all (1) between an inmate and an outsider. An administrator joins 50 the call with the administrator's voice muted. Next 55, the inmates and outsiders voice is split into a second call (2) while the initial call (1) remains untouched. Monitoring continues 60.

Referring also to FIG. 4, the system 10/35 an authorized user 25 within a facility has the monitors non-privileged phone calls. Solid lines represent a typical call from an incarcerated inmate 15 and an outside party 20 using standard monitoring. During a standard monitoring session, jail staff hear both parties. The jail staff does not transmit audio from himself or herself.

During a "muted" monitoring session, the jail staff 25 have the option to ignore incoming audio from one of the call parties. When jail staff 25 indicates they would like to mute one side of the party, the offsite phone switch 50 isolates the non-muted call channel and will only send this channel audio to the monitoring individual. This allows jail staff to easily monitor one side of the call without the distorting the audio from the other side. Dashed line represent audio flow during the muted session.

The embodiments above are chosen, described and illustrated to that persons skilled in the art will be able to understand the invention and the manner and process of making and using it. The descriptions and the accompanying drawings should be interpreted in the illustrative and not the exhaustive or limited sense. The invention is not intended to be limited the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A secure facility telecommunications system for monitoring telephone audio calls between an internal caller detained in the secure facility and an external caller located outside of the secure facility, comprising, a monitored phone disposed inside the secure facility for use by the internal caller detained in the secure facility, an outside telecommunication line connectible to the monitored phone and to an external phone used by the external caller located outside the secure facility, an audio monitoring station communicatively connectible to the monitored phone and to the external phone connected to the outside telecommunication line, the audio monitoring station receiving an internal audio channel from the monitored phone and an external audio channel from the external phone, and means to mute the external audio channel which the audio monitoring station receives from the external phone connected to the outside telecommunication line, whereby distorting sounds being transmitted to the audio monitoring station over the external audio channel may be muted so that a user of the audio monitoring station will hear words or sounds being spoken by the detained internal caller and being transmitted over the internal audio channel.

2. The secure facility telecommunications system of claim 1, wherein the secure facility is a jail and the detained internal caller is an inmate of the jail.

3. The secure facility telecommunication system of claim 2, wherein the monitored phone is an inmate phone adapted to be used by the inmate in the jail.

4. The secure facility telecommunication system of claim 3, wherein the audio monitoring station is adapted to be used by an authorized jail officer.

5. The secure facility telecommunications system of claim 1, wherein the outside telecommunications line is a VOIP line.

6. The secure facility telecommunications system of claim 1, wherein the outside telecommunications line is a POTS line.

7. The secure facility telecommunications system of claim 1, wherein the distorting sounds being transmitted over the external audio channel from the external phone connected to the outside telecommunication line that are intentionally transmitted by the external caller attempting to interfere with audio monitoring.

8. The secure telecommunications system of claim 1, wherein the means to mute includes a phone switch.

9. The secure telecommunications system of claim 8, wherein the phone switch is located externally with respect to the secure facility, and contains call channel isolation logic.

10. A secure jail facility telecommunications system that permits muting of incoming audio of one of the call parties between an inmate and an outside party to avoid efforts to disrupt conversation monitoring by way of the outside party playing loud music or other distorting sounds into the mouthpiece transmitting element of the outside party's telephone, comprising a. a monitored inmate phone disposed inside the secure facility for use by the inmate detained in the jail, b. a VOIP outside telecommunication line connectible to the monitored inmate phone and to an external phone used by the outside party located outside the jail, c. an audio monitoring station communicatively connectible to the monitored inmate phone and the outside telecommunication line, the audio monitoring station being adapted to be used by an authorized jail officer the audio monitoring station receiving an internal audio channel from the monitored inmate phone and an external audio channel from the external phone, and d. means to selectively mute the internal audio channel which the audio monitoring station receives from the inmate phone to be monitored or the external audio channel from the external phone connected to the outside telecommunication line, wherein the means to mute includes an phone switch located externally with respect to the secure facility and contains call channel isolation logic, whereby distorting sounds being transmitted to the audio monitoring station over the internal or external audio channel may be muted so that a user of the audio monitoring station will hear words or sounds being spoken by the detained internal caller and being transmitted over the internal audio channel or will hear words or sounds bring spoken by the external caller and being transmitted over the external channel.

* * * * *